(12) United States Patent
Ito

(10) Patent No.: US 12,091,096 B2
(45) Date of Patent: Sep. 17, 2024

(54) FIBER-REINFORCED RESIN COMPOSITE

(71) Applicant: SUBARU CORPORATION, Tokyo (JP)

(72) Inventor: Hiroyasu Ito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 432 days.

(21) Appl. No.: 16/998,289

(22) Filed: Aug. 20, 2020

(65) Prior Publication Data

US 2021/0086842 A1    Mar. 25, 2021

(30) Foreign Application Priority Data

Sep. 25, 2019 (JP) ................. 2019-173733

(51) Int. Cl.
| | |
|---|---|
| B32B 3/12 | (2006.01) |
| B29C 70/44 | (2006.01) |
| B29C 70/86 | (2006.01) |
| B62D 29/04 | (2006.01) |
| B29K 105/04 | (2006.01) |
| B29K 105/08 | (2006.01) |
| B29L 31/30 | (2006.01) |
| B62D 25/04 | (2006.01) |

(52) U.S. Cl.
CPC .......... B62D 29/043 (2013.01); B29C 70/446 (2013.01); B29C 70/865 (2013.01); *B29K 2105/045* (2013.01); *B29K 2105/08* (2013.01); *B29L 2031/3041* (2013.01); *B62D 25/04* (2013.01)

(58) Field of Classification Search
None
See application file for complete search history.

(56) References Cited

U.S. PATENT DOCUMENTS

| | | | | |
|---|---|---|---|---|
| 4,395,450 | A |   | 7/1983 | Whitener |
| 5,139,843 | A | * | 8/1992 | Murakami ................ B32B 5/10 |
| | | | | 428/116 |

(Continued)

FOREIGN PATENT DOCUMENTS

| | | | | |
|---|---|---|---|---|
| FR | 2992580 A1 | * | 1/2014 | ............ B32B 27/12 |
| JP | 1-237130 | | 9/1989 | |

(Continued)

OTHER PUBLICATIONS

Duval et al., machine translation of FR 2992580, Jan. 3, 2014 (Year: 2014).*

(Continued)

*Primary Examiner* — Mary I Omori
(74) *Attorney, Agent, or Firm* — TROUTMAN PEPPER HAMILTON SANDERS LLP

(57) ABSTRACT

A fiber-reinforced resin composite includes a honeycomb core, a fiber-reinforced resin layer, and a protection layer. The honeycomb core includes a plurality of cells that are defined by partition walls and extend in an axial direction. The fiber-reinforced resin layer is disposed around the honeycomb core. The fiber-reinforced resin layer includes continuous fibers wound around the honeycomb core. The protection layer is interposed between the honeycomb core and the fiber-reinforced resin layer. The protection layer is configured to prevent rupture of the continuous fibers.

9 Claims, 9 Drawing Sheets

(56) References Cited

U.S. PATENT DOCUMENTS

| | | | | |
|---|---|---|---|---|
| 2005/0161154 A1* | 7/2005 | Anderson | ............... | B32B 27/26 |
| | | | | 156/278 |
| 2010/0266808 A1* | 10/2010 | Klein | ...................... | E04C 2/324 |
| | | | | 428/116 |
| 2012/0321835 A1* | 12/2012 | Hethcock, Jr. | ........ | B32B 37/146 |
| | | | | 156/247 |
| 2013/0236688 A1* | 9/2013 | Stamp | ....................... | B32B 3/12 |
| | | | | 428/116 |
| 2015/0298368 A1* | 10/2015 | Krahnert | ............... | B29C 43/021 |
| | | | | 264/154 |
| 2015/0360733 A1* | 12/2015 | Nagwanshi | .......... | B62D 29/001 |
| | | | | 180/311 |
| 2017/0158252 A1* | 6/2017 | Milne | ................. | B32B 38/1808 |

FOREIGN PATENT DOCUMENTS

| | | |
|---|---|---|
| JP | 2006-76366 A | 3/2006 |
| WO | WO-2018019789 A1 * | 2/2018 |

OTHER PUBLICATIONS

The Pultrusion Process, 2015, Liberty Pultrusions (Year: 2015).*
Notice of Reasons for Refusal issued in Japanese Patent Application No. 2019-173733 dated Jun. 6, 2023, with machine translation.

* cited by examiner

FIBER-REINFORCED RESIN COMPOSITE

CROSS-REFERENCE TO RELATED APPLICATIONS

The present application claims priority from Japanese Patent Application No. 2019-173733 filed on Sep. 25, 2019, the entire contents of which are hereby incorporated by reference.

BACKGROUND

The disclosure relates to a fiber-reinforced resin composite using a fiber-reinforced resin.

Recently, for the purpose of weight reduction of vehicles such as passenger vehicles, study has been made on manufacturing a center pillar and other structural members of a vehicle body using a fiber-reinforced resin that includes reinforcement fibers such as carbon fibers. A component made of the fiber-reinforced resin has high rigidity and, in particular, exhibits high strength with respect to compressive stress or tensile stress applied in an orientation direction of the fibers. As one aspect of such a component using the fiber-reinforced resin, there is a fiber-reinforced resin composite including a core of a honeycomb structure (honeycomb core) and a fiber-reinforced resin layer formed on a surface layer of the honeycomb core. When the honeycomb core is used for a structural member of the vehicle body, the honeycomb core enhances resistance to a shock that is input upon a vehicle collision, for example, and the honeycomb core functions to absorb the shock by gradually collapsing.

[Patent Literature 1] Japanese Unexamined Patent Application Publication No. 2006-76366

SUMMARY

An aspect of the disclosure provides a fiber-reinforced resin composite. The composite includes a honeycomb core, a fiber-reinforced resin layer, and a protection layer. The honeycomb core includes a plurality of cells that are defined by partition walls and extend in an axial direction. The fiber-reinforced resin layer is disposed around the honeycomb core. The fiber-reinforced resin layer includes continuous fibers wound around the honeycomb core. The protection layer is interposed between the honeycomb core and the fiber-reinforced resin layer. The protection layer is configured to prevent rupture of the continuous fibers.

An aspect of the disclosure provides a manufacturing method of a fiber-reinforced resin composite. The fiber-reinforced resin composite includes a honeycomb core and a fiber-reinforced resin layer. The honeycomb core includes a plurality of cells that are defined by partition walls and extend in an axial direction. The fiber-reinforced resin layer is disposed around the honeycomb core. The fiber-reinforced resin layer includes continuous fibers wound around the honeycomb core. The method includes at least partly covering a circumferential portion of the honeycomb core with a protection member configured to prevent rupture of the continuous fibers. The method includes forming, around the circumferential portion of the honeycomb core at least partly covered with the protection member, the fiber-reinforced resin layer including the continuous fibers wound around the honeycomb core.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

When a structural member of a substantially cylindrical shape such as a center pillar is manufactured of a fiber-reinforced resin composite using a honeycomb core, a fiber-reinforced resin layer is formed so as to surround the honeycomb core. The honeycomb core is generally made of aluminum and hard resin. The honeycomb core includes a plurality of cells defined by partition walls, and the honeycomb core has an outer surface where edges of the partition walls are exposed. Consequently, when a reinforcement fiber sheet is wound around the honeycomb core, reinforcement fibers may be ruptured and degrade strength of the fiber-reinforced resin composite.

It is desirable to provide a fiber-reinforced resin composite with a fiber-reinforced resin layer disposed around a honeycomb core in such a manner that reinforcement fibers can be prevented from being ruptured by the honeycomb core so as to reduce a decrease in strength of the fiber-reinforced resin composite.

Figure 1:
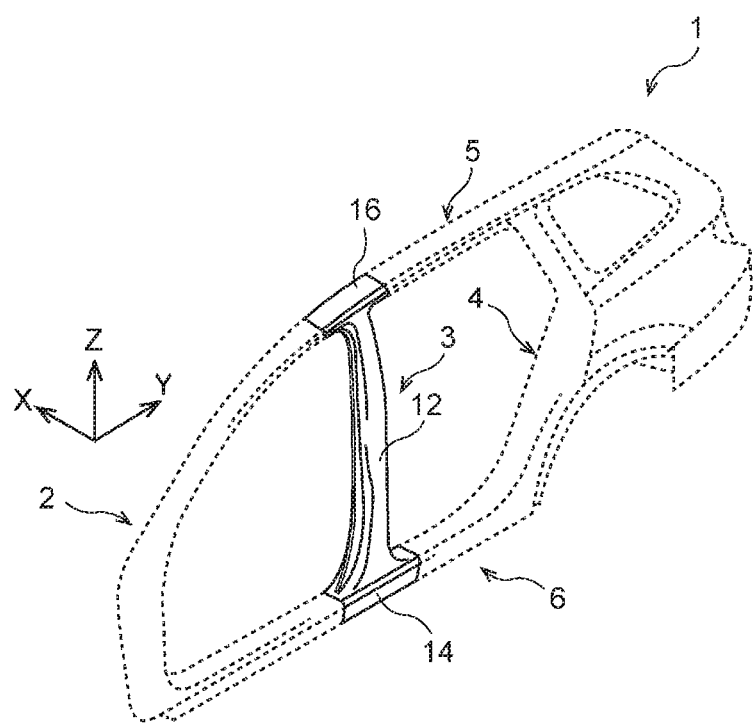
FIG. 1 is a schematic diagram illustrating an external appearance of a vehicle side body structure.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Fiber-Reinforced Resin Composite As an exemplary fiber-reinforced resin composite according to the embodiment of the disclosure, a center pillar using the fiber-reinforced resin composite will be described below. FIG. 1 is a schematic diagram illustrating an external appearance of a vehicle side body structure 1. The vehicle side body structure 1 in FIG. 1 is a schematic illustration of a partial configuration of a left side portion of a vehicle. In this specification, as illustrated in FIG. 1, occasionally, a vehicle width direction will be referred to as X direction, a fore-and-aft direction of the vehicle (vehicle longitudinal direction) will be referred to as Y direction, and a vehicle height direction will be referred to as Z direction.

The vehicle side body structure 1 includes, for example, a roof pillar 5, a rear pillar 4, a front pillar 2, a center pillar 3, and a side sill 6. The roof pillar 5 extends along the vehicle longitudinal direction in an upper portion of vehicle cabin space in the vehicle and forms a side portion of a roof of the vehicle. The side sill 6 extends along the vehicle longitudinal direction at a bottom of the side portion of the vehicle.

The front pillar 2 has a lower end coupled to a front end of the side sill 6 and has an upper end coupled to a front end of the roof pillar 5. The front pillar 2 forms a front portion that constitutes the vehicle cabin space in the vehicle and is positioned to support a side of a windshield. The rear pillar 4 has a lower end coupled to a rear end of the side sill 6 and has an upper end coupled to a rear end of the roof pillar 5. The center pillar 3 has a lower end coupled to a center portion of the side sill 6 in the vehicle longitudinal direction and has an upper end coupled to a center portion of the roof pillar 5 in the vehicle longitudinal direction.

An opening for a front door is defined in a region surrounded by the side sill 6, the roof pillar 5, the front pillar 2, and the center pillar 3. An opening for a rear door is defined in a region surrounded by the side sill 6, the roof pillar 5, the rear pillar 4, and the center pillar 3. Each component that constitutes the vehicle side body structure 1 may include a plurality of components. For example, each component may include an outer panel on an outer side in the vehicle width direction that is bonded to an inner panel on an inner side in the vehicle width direction.

In the vehicle side body structure 1, the center pillar 3 has a longitudinal direction along the vehicle height direction and has a substantially cylindrical shape. The center pillar 3 includes a roof-pillar coupler 16 disposed on the upper end thereof, a side-sill coupler 14 disposed on the lower end thereof, and a pillar main body 12 located between the roof-pillar coupler 16 and the side-sill coupler 14. In this embodiment, the center pillar 3 is molded using a fiber-reinforced resin.

Figure 2:
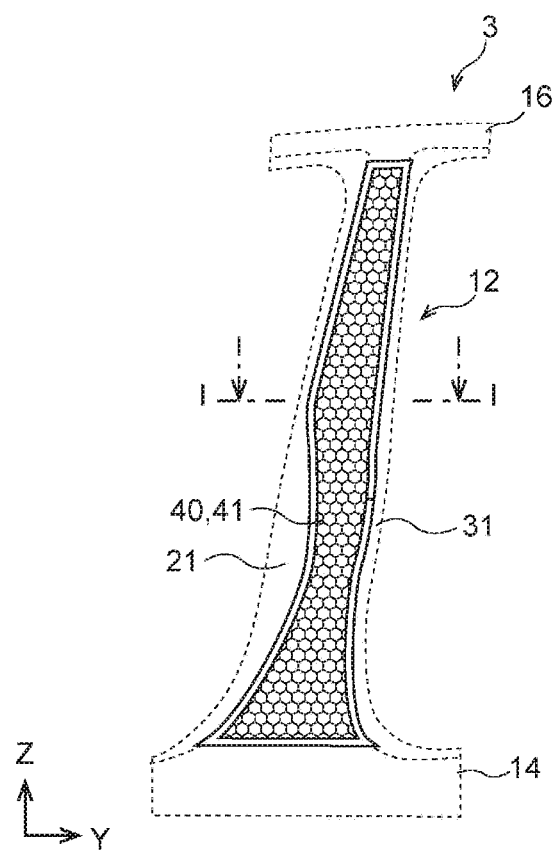
FIG. 2 is a schematic diagram illustrating a center pillar using a fiber-reinforced resin composite according to an embodiment of the disclosure, as viewed in an X direction.
Figure 3:
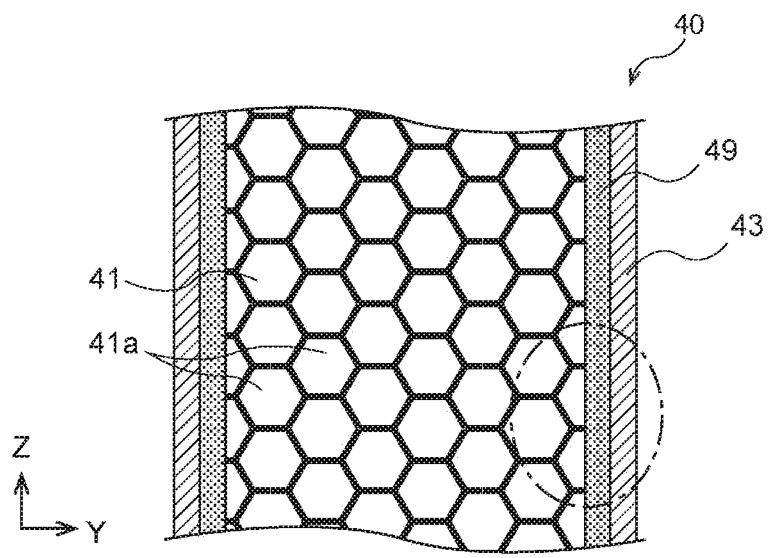
FIG. 3 is an enlarged diagram illustrating an internal configuration of a cylindrical member of a pillar main body according to the embodiment.
Figure 4:
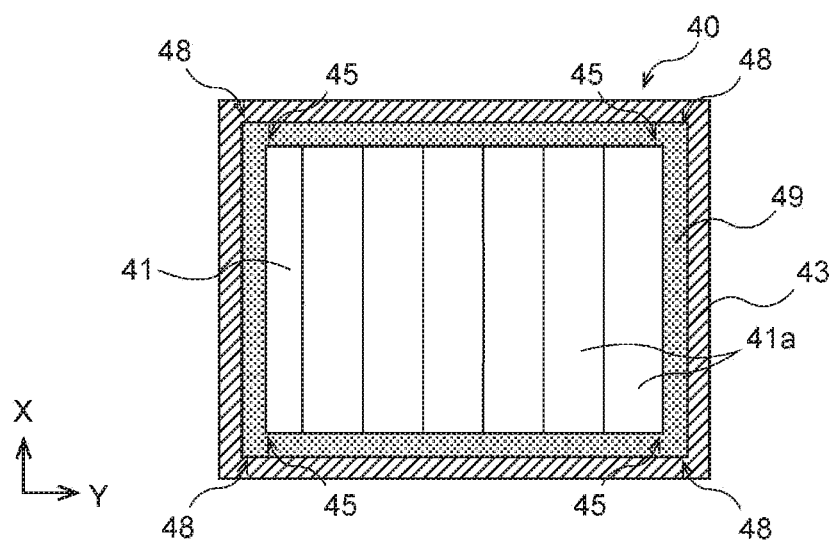
FIG. 4 is a cross-sectional view of the cylindrical member of the pillar main body according to the embodiment.

FIGS. 2 to 4 are diagrams illustrating a configuration of the center pillar 3. FIG. 2 is a diagram illustrating an internal configuration of the center pillar 3. FIG. 2 illustrates an internal configuration of the pillar main body 12 as viewed in the vehicle width direction from the outside of the vehicle. FIG. 3 is an enlarged diagram illustrating the internal configuration of the pillar main body 12 in FIG. 2. FIG. 4 is a cross-sectional view of a cylindrical member 40 of the pillar main body 12, taken along the line I-I in FIG. 2, as viewed in a direction indicated by the arrows.

The roof-pillar coupler 16 and the side-sill coupler 14 of the center pillar 3 are each of a substantially cylindrical shape having an axial direction along the vehicle longitudinal direction. The pillar main body 12 is of a substantially cylindrical shape having an axial direction along the vehicle height direction. The roof-pillar coupler 16 and the side-sill coupler 14 may have either one of a hollow cylindrical shape and a solid cylindrical shape. The pillar main body 12 includes the cylindrical member 40 made as the fiber-reinforced resin composite according to this embodiment, and flanges 21 and 31 disposed on opposite sides of the cylindrical member 40 in the vehicle width direction. The flanges 21 and 31 are adhered to side surfaces of the cylindrical member 40 with an adhesive, for example. The flanges 21 and 31 function as components such as doorstops for the front door and the rear door.

The cylindrical member 40 is a composite using the fiber-reinforced resin that includes reinforcement fibers impregnated with a thermoplastic resin or a thermosetting resin so as to implement high strength and weight reduction.

As illustrated in FIGS. 3 and 4, the cylindrical member 40 includes a honeycomb core 41, a fiber-reinforced resin layer 43 surrounding the honeycomb core 41, and a protection layer 49. The honeycomb core 41 is a structural member including a plurality of cells 41a that are defined by partition walls and extend in an axial direction. The fiber-reinforced resin layer 43 includes the reinforcement fibers wound around the honeycomb core 41 and is molded by curing the thermoplastic resin or the thermosetting resin. The reinforcement fibers of the fiber-reinforced resin layer 43 are continuous fibers that continue for a predetermined length and wound about an axis of the cylindrical member 40 extending in the vehicle height direction. The continuous fibers of the fiber-reinforced resin sheet may be oriented in a single direction or in different directions.

Figure 5:
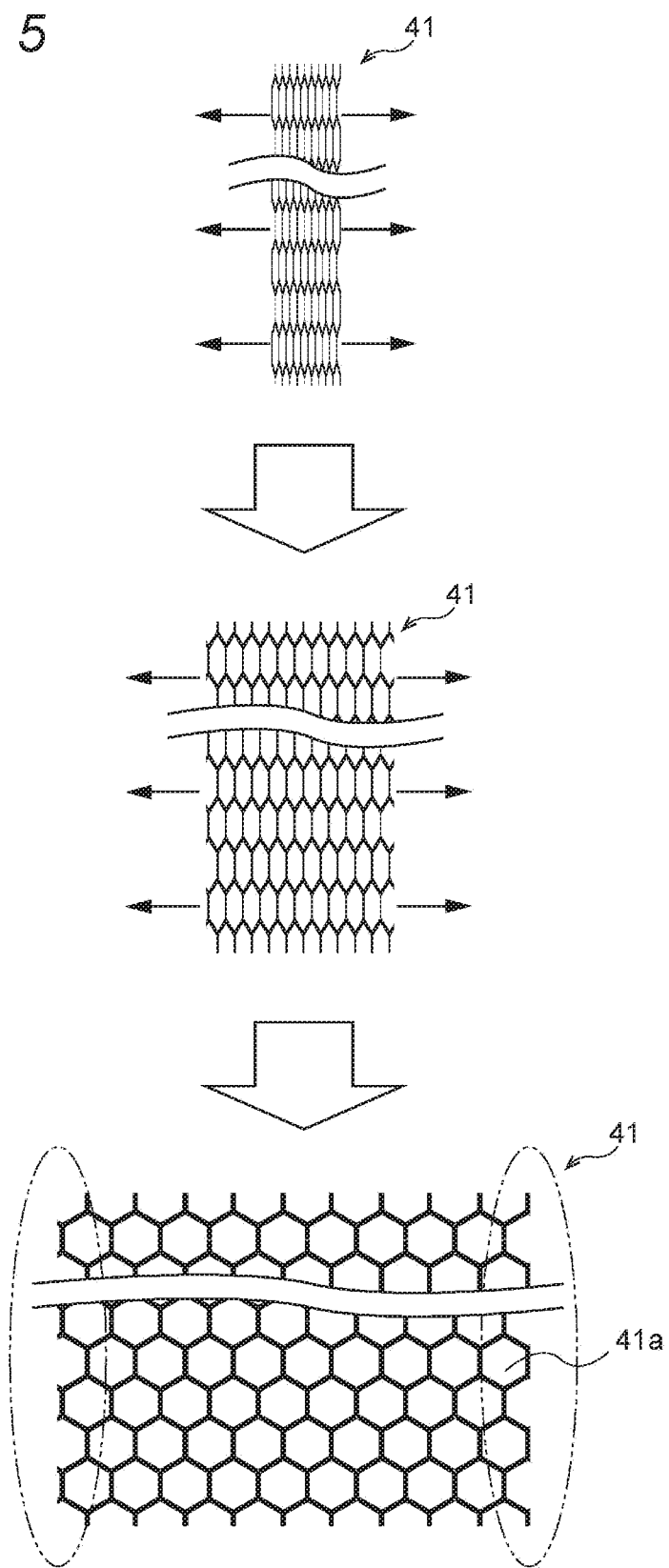
FIG. 5 is a diagram illustrating an exemplary honeycomb core.

FIG. 5 is a diagram illustrating an example of the honeycomb core 41. The honeycomb core 41 is made of, for example, aluminum or a resin material. In this embodiment, the honeycomb core 41 is made of a thin plate of aluminum. For example, a plurality of thin plates of aluminum are stacked while partly bonded together, and the thin plates of aluminum are expanded to form the honeycomb core 41. In this embodiment, the cells 41a of the honeycomb core 41 each have a hexagonal prism shape. However, the cells 41a may have a quadrangular prism shape.

The honeycomb core 41 may be a structural member formed by molding such as die casting. In some embodiments, the plurality of thin plates of aluminum are employed because thickness of the partition walls can be decreased to implement further weight reduction. It is noted that when the honeycomb core 41 is formed by molding, the cells 41a are not limited to a quadrangular prism shape or a hexagonal prism shape but may have, for example, a triangular prism shape or an octagonal prism shape.

Referring back to FIGS. 2 to 4, the honeycomb core 41 is positioned in such a manner that the axial direction of the cells 41a is along the vehicle width direction (X direction). The center pillar 3 functions to protect an occupant of the vehicle cabin upon a side collision of the vehicle. For this reason, the axial direction of the cells 41a is set along an input direction of a shock load predicted at the time of a side collision of the vehicle. With this setting, strength of the center pillar 3 can be enhanced, and also, when the shock load is input, the honeycomb core 41 can gradually collapse to absorb the shock.

As described above, the fiber-reinforced resin layer 43 is formed by curing the fiber-reinforced resin sheet including the continuous fibers. The fiber-reinforced resin sheet including the continuous fibers is a sheet including continuous fibers impregnated with a matrix resin. The fiber-reinforced resin layer 43 may include staple fibers other than the continuous fibers. As a typical example of the continuous fibers, carbon fibers may be employed. However, other kinds of fibers are not excluded. Moreover, a combination of a plurality of kinds of fibers may be employed. In some embodiments, since carbon fibers have notable mechanical characteristics, the reinforcement fibers include carbon fibers.

A thermoplastic resin or a thermosetting resin is used as the matrix resin of the fiber-reinforced resin sheet. Examples of the thermoplastic resin may include polyethylene resin, polypropylene resin, polyvinyl chloride resin, acrylonitrile-butadiene-styrene copolymerized synthetic resin (ABS resin), polystyrene resin, acrylonitrile-styrene copolymerized synthetic resin (AS resin), polyamide resin, polyacetal resin, polycarbonate resin, polyester resin, polyphenylene sulfide (PPS) resin, fluororesin, polyetherimide resin, polyether-ketone resin, and polyimide resin.

As the matrix resin, one kind or a mixture of two or more kinds of these thermoplastic resins may be used. Alternatively, the matrix resin may be a copolymer of these thermoplastic resins. In the case of a mixture of the thermoplastic resins, a compatibilizing agent may be added. Furthermore, as a flame retardant, a brominated flame retardant, a silicon-based flame retardant, red phosphorus, and such substances may be added to the thermoplastic resin.

Examples of the thermosetting resin may include epoxy resin, unsaturated polyester resin, vinyl ester resin, phenol resin, polyurethane resin, and silicon resin. As the matrix resin, one kind or a mixture of two or more kinds of these thermosetting resins may be used. In the case of using these thermosetting resins, a curing agent and a reaction accelerator may be suitably added to the thermosetting resins.

The protection layer 49 is interposed between the honeycomb core 41 and the fiber-reinforced resin layer 43 and functions to prevent rupture of the continuous fibers of the fiber-reinforced resin layer 43. In some embodiments, the protection layer 49 is interposed between the honeycomb core 41 and the fiber-reinforced resin layer 43 at least at external bent portions of the honeycomb core 41 so as to cover the bent portions.

For example, as illustrated in FIG. 4, in a cross section of the cylindrical member 40 as viewed in the axial direction, the protection layer 49 is disposed to cover four corners 45, which are the external bent portions of the honeycomb core 41. In this embodiment, the cylindrical member 40 of the center pillar 3 has a longitudinal direction along the vehicle height direction (Z direction), and the cells 41a of the honeycomb core 41 have an axial direction along the vehicle width direction (X direction) intersecting the vehicle height direction (Z direction). The protection layer 49 is disposed over an entire circumference of the honeycomb core 41 and covers all of the four corners 45 of the honeycomb core 41.

At the external bent portions of the honeycomb core 41 that constitutes the cylindrical member 40, edges of the honeycomb core 41 are sharp in some cases. Especially when the honeycomb core 41 is formed by expanding the plurality of thin plates, the corners 45 of the honeycomb core 41 are more likely to have sharp edges. The protection layer 49 covers the corners 45 of the honeycomb core 41 so that when the fiber-reinforced resin layer 43 is formed by winding the fiber-reinforced resin sheet around the honeycomb core 41 about the axis, the protection layer 49 functions to prevent the continuous fibers from being ruptured by the edges of the honeycomb core 41. Thus, the cylindrical member 40 can be prevented from decreasing in strength.

In this embodiment, the protection layer 49 is disposed over the entire circumference of the honeycomb core 41 and covers side surfaces of the honeycomb core 41 other than the corners 45. When the honeycomb core 41 is formed by expanding the plurality of thin plates of aluminum, as described above, the side surfaces of the honeycomb core 41 have edges in some cases. Therefore, the protection layer 49 covers not only the corners 45 but also the side surfaces of the honeycomb core 41 other than the corners 45 so that when the fiber-reinforced resin layer 43 is formed by winding the fiber-reinforced resin sheet around the honeycomb core 41, the continuous fibers do not contact with regions of the honeycomb core 41 other than the corners 45. With the honeycomb core 41 and the continuous fibers being apart from each other, the protection layer 49 can further reduce the possibility of rupture of the continuous fibers.

The protection layer 49 may be made of a suitable material, such as, metal, resin, fiber, and nonwoven fabric. However, in manufacturing the cylindrical member 40, the protection layer 49 is formed of a protection member 49' (see FIG. 8) disposed on the surface of the honeycomb core 41 before the fiber-reinforced resin layer 43 is formed. For this reason, in some embodiments, the protection layer 49 is made at least of a material that can be secured to the honeycomb core 41 and can maintain the shape.

Figure 6:
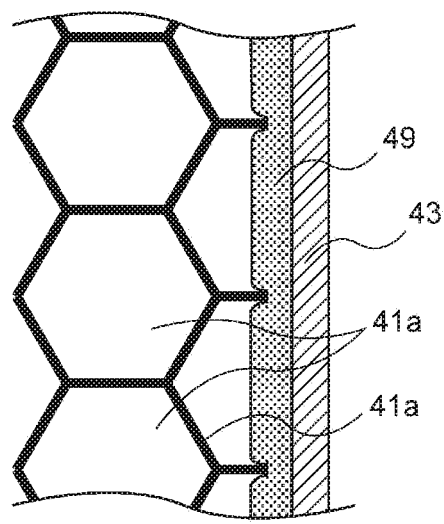
FIG. 6 is an enlarged diagram illustrating a side part of the internal configuration of the cylindrical member according to the embodiment.

In some embodiments, the protection layer 49 is formed of a fiber sheet. The protection layer 49 formed of the fiber sheet can consequently reduce an increase in weight of the cylindrical member 40. In some embodiments, in the case of the protection layer 49 formed of the fiber sheet, the protection layer 49 includes fibers having a fiber length less than the continuous fibers of the fiber-reinforced resin layer 43. In some embodiments, the protection layer 49 includes fibers shorter than at least a caliber of the cells 41a of the honeycomb core 41. Thus, as illustrated in FIG. 6, the protection layer 49 partly enters recesses formed in the surface of the honeycomb core 41 so as to enhance bonding strength between the honeycomb core 41 and the protection layer 49.

The protection layer 49 made of such a fiber sheet may be formed, for example, by curing a resin in the fiber sheet where fibers are oriented in random directions. The protection layer 49 may include a resin having compatibility with the matrix resin that constitutes the fiber-reinforced resin layer 43 and may include incompatible material. In manufacturing the cylindrical member 40, the protection member 49' that forms the protection layer 49 is disposed on the surface of the honeycomb core 41 before the fiber-reinforced resin layer 43 is formed. Therefore, no matter what material constitutes the protection layer 49, when at least the fiber-reinforced resin sheet or a prepreg is wound, the continuous fibers can be prevented from being ruptured by the edges of the honeycomb core 41.

It is noted that even when the protection layer 49 includes a resin compatible with the matrix resin that constitutes the fiber-reinforced resin layer 43, analysis is made to check, for example, the presence of the continuous fibers, a kind of the fibers, and an orientation state of the fibers so as to specify the presence of the protection layer 49.

In some embodiments, as illustrated in FIG. 4, an external shape of corners 48 of the protection layer 49 that correspond to positions of the corners 45 of the honeycomb core 41 is curved. The corners 48 of the protection layer 49 are curved in such a manner that when the fiber-reinforced resin layer 43 is formed by winding the fiber-reinforced resin sheet around the honeycomb core 41 on which the protection layer 49 is formed, the continuous fibers can be made less likely to be ruptured by the corners 48 of the protection layer 49. Insofar as a desired portion of the honeycomb core 41 can be covered, the protection layer 49 is not limited to a particular shape.

Figure 7:
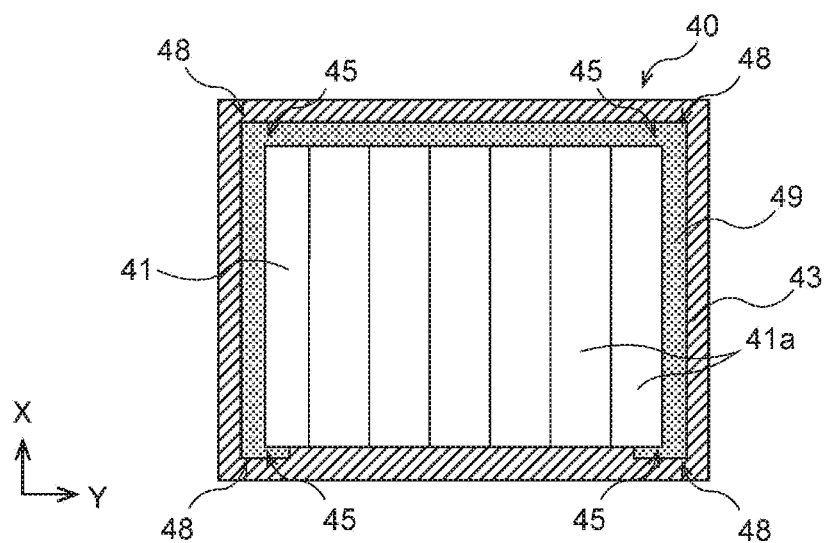
FIG. 7 is a diagram illustrating a modification example of a protection layer.

The protection layer 49 may have a function to make an outer side (vehicle external side) and an inner side (vehicle cabin side) of the center pillar 3 different in strength. Referring to FIG. 7, the protection layer 49 is formed over an entire inner side surface of the center pillar 3 whereas the protection layer 49 is not formed on an outer side surface of the center pillar 3. This makes strength on the inner side larger than strength on the outer side so that upon a side collision of the vehicle, the protection layer 49 supports a rear end side (the inner side) of the honeycomb core 41 to prevent deformation of the honeycomb core 41. Upon the side collision of the vehicle, this configuration facilitates gradual collapse of the cylindrical member 40 and can adjust an amount of absorption of the shock load by the collapse of the honeycomb core 41.

As has been described so far, in the center pillar 3 including the cylindrical member 40 composed of the fiber-reinforced resin composite according to this embodiment, the continuous fibers of the fiber-reinforced resin layer 43 disposed around the honeycomb core 41 are prevented from being ruptured. Consequently, the center pillar 3 can be prevented from decreasing in strength and can appropriately implement the function to absorb the shock at the time of the side collision of the vehicle.

Manufacturing Method of Fiber-Reinforced Resin Composite

Next, description will be made on an exemplary manufacturing method of the cylindrical member 40 composed of the fiber-reinforced resin composite according to this embodiment.

Figure 8:
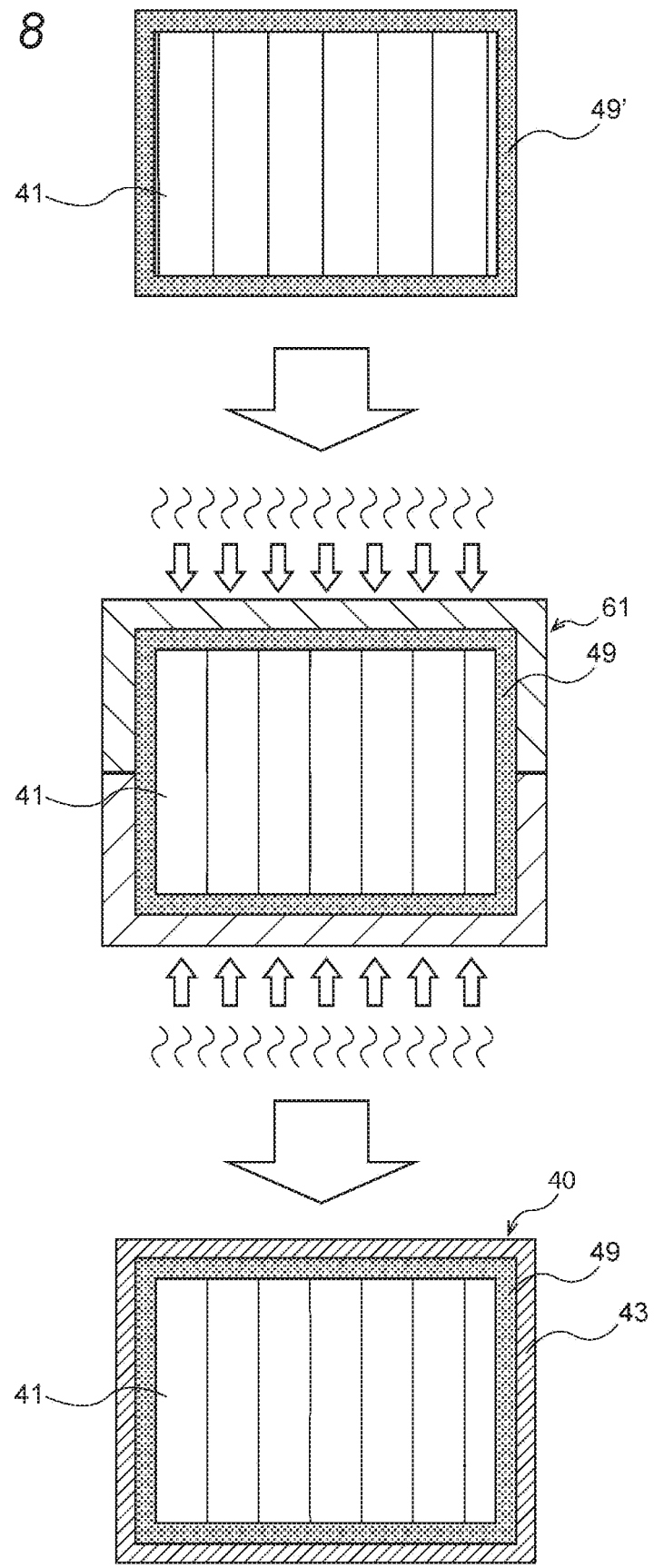
FIG. 8 is a diagram illustrating a manufacturing method of the cylindrical member according to the embodiment.

FIG. 8 is a diagram illustrating the manufacturing method of the cylindrical member 40. The manufacturing method of the cylindrical member 40 includes a step of covering at least part of a circumferential portion of the honeycomb core 41 with the protection member 49', and a step of forming the fiber-reinforced resin layer 43 around the honeycomb core 41 covered with the protection member 49'. The fiber-reinforced resin layer 43 includes the continuous fibers wound around the honeycomb core 41. In the diagram of FIG. 8, the cylindrical member 40 to be manufactured is illustrated as in the corresponding cross-sectional view of FIG. 4.

First, the protection member 49' is disposed around the honeycomb core 41. The protection member 49' functions as the protection layer 49 in the cylindrical member 40 and is made of a suitable material, such as metal, resin, fiber, and nonwoven fabric. In some embodiments, the protection member 49' is, for example, a fiber sheet including fibers shorter than the caliber of the cells 41a of the honeycomb core 41. When the protection member 49' is the fiber sheet, the protection member 49' is impregnated with a thermoplastic resin or a thermosetting resin before or after the protection member 49' is wound around the honeycomb core 41.

Thereafter, using a mold 61, the resin is cured while the honeycomb core 41 around which the protection member 49' is disposed is pressed to form the protection layer 49 having a desired external shape. At this time, in some embodiments, the external shape of the corners 48 of the protection layer 49 along the corners 45 of the honeycomb core 41 is curved. The corners 48 of the protection layer 49 are curved in such a manner that when the fiber-reinforced resin layer 43 is formed by winding the fiber-reinforced resin sheet around the honeycomb core 41 on which the protection layer 49 is formed, the continuous fibers can be made less likely to be ruptured by the corners 48 of the protection layer 49.

After the protection layer 49 is formed, surface processing may be performed to increase surface roughness of the protection layer 49 so as to enhance bonding strength between the protection layer 49 and the fiber-reinforced resin layer 43. For example, sandpaper may be employed for the surface processing.

Next, the fiber-reinforced resin layer 43 is formed around the honeycomb core 41 surrounded by the protection layer 49. At this time, the honeycomb core 41 is at least partly surrounded by the protection layer 49 so that the continuous fibers of the fiber-reinforced resin layer 43 are prevented from being ruptured by the edges of the honeycomb core 41. Thus, the cylindrical member 40 including the protection layer 49 between the honeycomb core 41 and the fiber-reinforced resin layer 43 can be obtained.

In the case of forming the fiber-reinforced resin layer 43 using the fiber-reinforced resin sheet that includes the thermoplastic resin and the continuous fibers, cold press molding, for example, may be adopted. In the case of cold press molding of the fiber-reinforced resin layer 43, for example, after a plurality of fiber-reinforced resin sheets are laminated to form a prepreg of a predetermined thickness, the thermoplastic resin is turned into a semi-molten state, and the prepreg is wound around the honeycomb core 41. Subsequently, the honeycomb core 41 wound with the prepreg in the semi-molten state is introduced into a mold and cooled to a temperature less than a melting point of the thermoplastic resin so as to cure the fiber-reinforced resin sheets to form the fiber-reinforced resin layer 43.

It is noted that when the thermoplastic resin is used, a forming method of the fiber-reinforced resin layer 43 is not limited to the cold press molding. Winding the fiber-reinforced resin including the continuous fibers around the honeycomb core 41 is not limited to a method using the prepreg but may be other methods, such as braiding, filament winding, and sheet winding.

Figure 9:
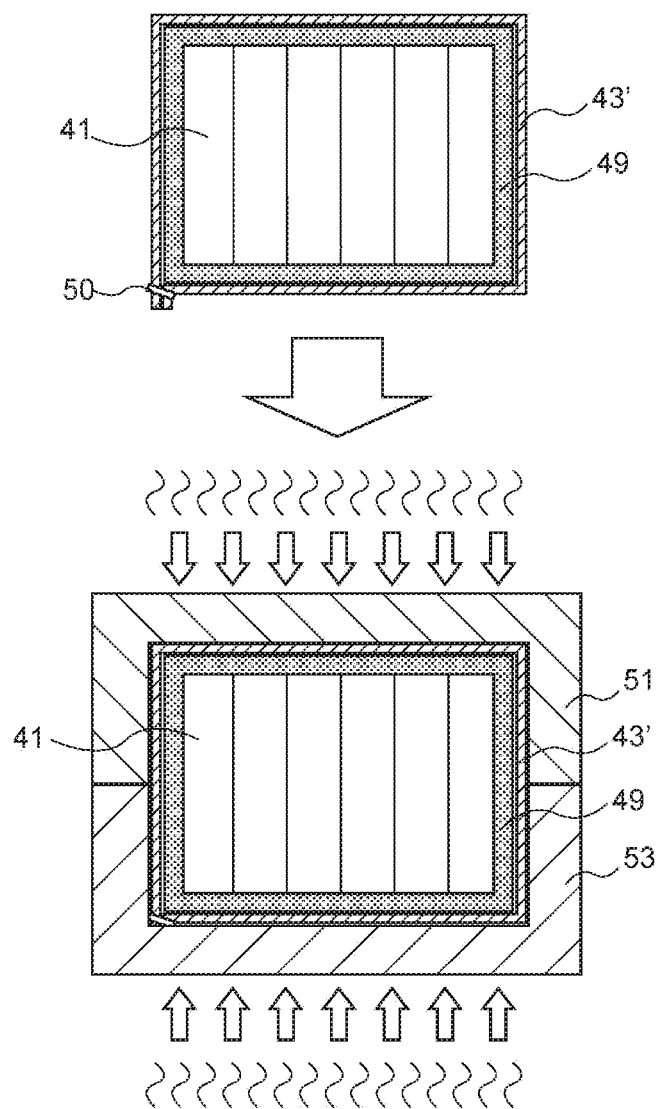
FIG. 9 is a diagram illustrating an example of forming a fiber-reinforced resin layer by hot press molding.

In the case of forming the fiber-reinforced resin layer 43 using the fiber-reinforced resin sheet that includes the thermosetting resin and the continuous fibers, hot press molding, for example, may be adopted. FIG. 9 illustrates an example of forming the fiber-reinforced resin layer 43 by hot press molding using the fiber-reinforced resin sheet including the thermosetting resin as the matrix resin.

Figure 10:
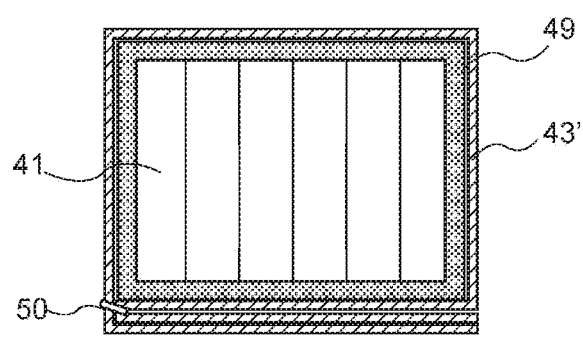
FIG. 10 is a diagram illustrating an example of folding back and winding a part of the prepreg.

First, a prepreg 43' in a semi-molten state is wound around the honeycomb core 41 surrounded by the protection layer 49. The prepreg 43' is a laminate of the fiber-reinforced resin sheets including the continuous fibers. The prepreg 43' is not limited to the laminate of the fiber-reinforced resin sheets but may be a single fiber-reinforced resin sheet. The wound prepreg 43' may be secured with fasteners 50 such as snap pins. The prepreg 43' may be folded back and laminated to enhance strength of the cylindrical member 40 (see FIG. 10).

At this time, because the honeycomb core 41 is at least partly surrounded by the protection layer 49, the continuous fibers of the prepreg 43' are prevented from being ruptured by the edges of the honeycomb core 41.

Next, the honeycomb core 41 wound with the prepreg 43' is introduced into a mold and heated under pressure to cure the prepreg 43'. The mold is composed of an upper die 51 and a lower die 53. Thus, the cylindrical member 40 of a desired shape can be molded.

Figure 11:
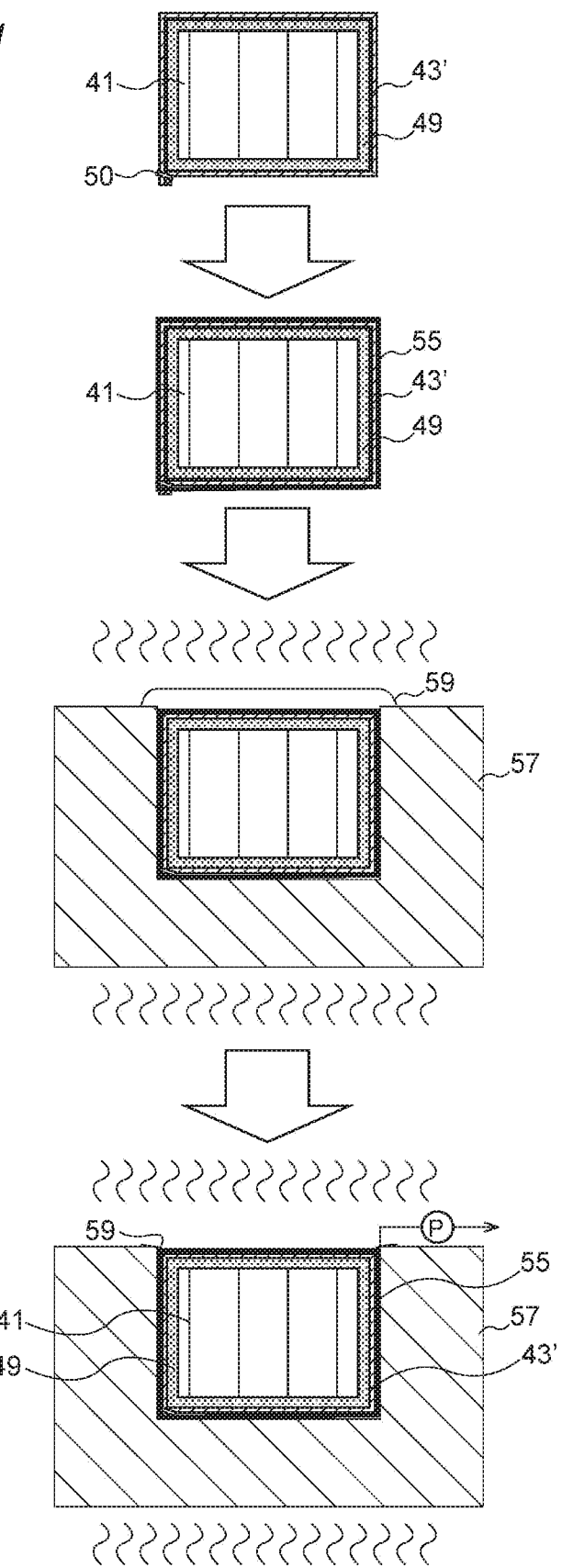
FIG. 11 is a diagram illustrating an example of forming the fiber-reinforced resin layer by autoclave molding.

Alternatively, in the case of forming the fiber-reinforced resin layer 43 using the fiber-reinforced resin sheet that includes the thermosetting resin and the continuous fibers, autoclave molding, for example, may be adopted. FIG. 11 illustrates an example of forming the fiber-reinforced resin layer 43 by autoclave molding using the fiber-reinforced resin sheet including the thermosetting resin as the matrix resin.

First, in substantially the same manner as the hot press molding, the prepreg 43' in a semi-molten state is wound around the honeycomb core 41 surrounded by the protection layer 49. The prepreg 43' is a laminate of the fiber-reinforced resin sheets including the continuous fibers. Next, an adhesive heat-shrinkable sheet 55 is further wound around the honeycomb core 41 wound with the prepreg 43' so as to secure the prepreg 43'. The heat-shrinkable sheet 55 may be, for example, a sheet of a heat-shrinkable resin. The heat-shrinkable sheet 55 may be a sheet including reinforcement fibers.

At this time, the honeycomb core 41 is at least partly surrounded by the protection layer 49 so that when the prepreg 43' is wound or when the heat-shrinkable sheet 55 is wound, the continuous fibers of the prepreg 43' are prevented from being ruptured by the edges of the honeycomb core 41.

Subsequently, after the honeycomb core 41 wound with the prepreg 43' and the heat-shrinkable sheet 55 is introduced into a mold 57 and bagged, an interior of a bag 59 is made vacuous and heated in an autoclave apparatus to cure the prepreg 43' and the heat-shrinkable sheet 55. Thus, the cylindrical member 40 of a desired shape can be molded.

It is noted that when the thermosetting resin is used, a forming method of the fiber-reinforced resin layer 43 is not limited to the hot press molding and the autoclave molding. Winding the fiber-reinforced resin including the continuous fibers around the honeycomb core 41 is not limited to a method using the prepreg but may be other methods, such as braiding, filament winding, and sheet winding.

As described above, in the fiber-reinforced resin composite according to this embodiment, the protection layer 49 is interposed between the honeycomb core 41 and the fiber-reinforced resin layer 43 and covers at least part of the circumferential portion of the honeycomb core 41 so that the continuous fibers exist in the fiber-reinforced resin layer 43 without being ruptured. This prevents a decrease in strength of the fiber-reinforced resin composite. When the fiber-reinforced resin composite is used as a structural member of the vehicle body such as the center pillar 3 according to this embodiment, the continuous fibers existing in the fiber-reinforced resin layer 43 without being ruptured enables the center pillar 3 to appropriately absorb a shock load when the shock load is input.

In the manufacturing method of the fiber-reinforced resin composite according to this embodiment, after at least part of the circumferential portion of the honeycomb core 41 is covered with the protection layer 49, the fiber-reinforced resin layer 43 including the continuous fibers is formed. Consequently, when the fiber-reinforced resin sheet or the prepreg 43' is wound or cured, the continuous fibers can be prevented from being ruptured. This makes it possible to manufacture the fiber-reinforced resin composite that prevents a decrease in strength owing to rupture of the continuous fibers.

The embodiment of the disclosure has been described in detail above with reference to the accompanying drawings. The disclosure is not limited to such an embodiment. It is apparent that those who have ordinary knowledge in the technical field to which the disclosure pertains would conceive various changes and modifications within the scope of the appended claims, and it is to be understood that such changes and modifications also fall within the technical scope of the disclosure. Moreover, combinations of the embodiment with those changes and modifications likewise fall within the technical scope of the disclosure as a matter of course.

For example, in the above-described embodiment, the corners 45 that appear in a cross section of the honeycomb core 41 as viewed in the axial direction are described as an example of the external bent portions of the honeycomb core 41. However, the bent portions are not limited to the corners 45. Other than the corners 45 that appear in a cross section of the honeycomb core 41 as viewed in the axial direction, the protection layer 49 may be suitably disposed on any external bent portion where the honeycomb core 41 may have a sharp edge.

In the embodiment, the cylindrical member 40 of the pillar main body 12 of the center pillar 3 is described as an example of the fiber-reinforced resin composite. However, the fiber-reinforced resin composite is not limited to such an example. The embodiment of the disclosure is applicable to any composite that is formed by winding a fiber-reinforced resin sheet including continuous fibers around a honeycomb core.

As has been described heretofore, the embodiment of the disclosure provides the fiber-reinforced resin composite with the fiber-reinforced resin layer disposed around the honeycomb core in such a manner that the reinforcement fibers can be prevented from being ruptured by the honeycomb core to reduce a decrease in strength of the fiber-reinforced resin composite.

The invention claimed is:

1. A fiber-reinforced resin composite comprising:
a honeycomb core comprising an inner side, an outer side, a plurality of corners on the inner side and the outer side, and a plurality of cells that are defined by partition walls, the plurality of cells extending in an axial direction between the inner side and the outer side;
a fiber-reinforced resin layer disposed around the honeycomb core, the fiber-reinforced resin layer comprising continuous fibers wound around the honeycomb core; and
a protection layer interposed between the honeycomb core and the fiber-reinforced resin layer, wherein the protection layer is disposed to wrap around each of the plurality of corners on the inner side and the outer side of the honeycomb core,
wherein the protection layer comprises fibers at least shorter than a caliber of the plurality of cells of the honeycomb core and a part of the protection layer enters recesses formed in a surface of the honeycomb core,
wherein a first portion of the protection layer on the inner side that wraps around the corners on the inner side is thicker than a second portion of the protection layer on the outer side that wraps around the corners on the outer side.

2. The fiber-reinforced resin composite according to claim 1, wherein the protection layer comprises fibers having a fiber length less than a fiber length of the continuous fibers of the fiber-reinforced resin layer.

3. The fiber-reinforced resin composite according to claim 2, wherein,
the axial direction of the plurality of cells of the honeycomb core intersects a longitudinal direction of the fiber-reinforced resin composite,
the honeycomb core comprises an external bent portion, and
the protection layer covers at least the bent portion extending along the longitudinal direction.

4. The fiber-reinforced resin composite according to claim 2, wherein the honeycomb core is apart from the continuous fibers of the fiber-reinforced resin layer.

5. The fiber-reinforced resin composite according to claim 1, wherein,
   the axial direction of the plurality of cells of the honeycomb core intersects a longitudinal direction of the fiber-reinforced resin composite,
   the honeycomb core comprises an external bent portion, and
   the protection layer covers at least the bent portion extending along the longitudinal direction.

6. The fiber-reinforced resin composite according to claim 1, wherein the honeycomb core is apart from the continuous fibers of the fiber-reinforced resin layer.

7. The fiber-reinforced resin composite according to claim 1, wherein the fiber-reinforced resin layer is wound around an entire circumference of the honeycomb core.

8. The fiber-reinforced resin composite according to claim 1, wherein an external shape of the protection layer corresponding to each of the plurality of corners on the inner side and the outer side of the honeycomb core is curved.

9. A manufacturing method of the fiber-reinforced composite of claim 1,
   the method comprising:
   at least partly covering a circumferential portion of the honeycomb core with the protection layer configured to prevent rupture of the continuous fibers; and
   forming, around the circumferential portion of the honeycomb core at least partly covered with the protection layer, the fiber-reinforced resin layer comprising the continuous fibers wound around the honeycomb core.

* * * * *